(12) United States Patent
Hayashi et al.

(10) Patent No.: US 6,516,110 B2
(45) Date of Patent: Feb. 4, 2003

(54) OPTICAL CROSS-CONNECTOR

(75) Inventors: Michiaki Hayashi, Kamifukuoka (JP);
Kazuho Ohara, Kamifukuoka (JP);
Hideaki Tanaka, Kamifukuoka (JP);
Masatoshi Suzuki, Kamifukuoka (JP)

(73) Assignee: KDDI Corporation, Tokyo (JP)

( * ) Notice: Subject to any disclaimer, the term of this patent is extended or adjusted under 35 U.S.C. 154(b) by 0 days.

(21) Appl. No.: 09/955,726

(22) Filed: Sep. 18, 2001

(65) Prior Publication Data

US 2002/0034354 A1 Mar. 21, 2002

(30) Foreign Application Priority Data

Sep. 20, 2000 (JP) ......................... 2000-285160

(51) Int. Cl.[7] ................................ G02B 6/26
(52) U.S. Cl. ......................... 385/17; 359/128
(58) Field of Search ............................. 385/17, 18, 24, 385/42, 48, 88, 89; 359/115, 124, 127, 128, 139

(56) References Cited

U.S. PATENT DOCUMENTS

| | | | | |
|---|---|---|---|---|
| 4,988,157 A | * | 1/1991 | Jackel et al. ................ | 385/17 |
| 5,018,129 A | * | 5/1991 | Netravali et al. ........... | 359/115 |
| 5,937,117 A | * | 8/1999 | Ishida et al. ................ | 385/24 |
| 5,960,132 A | | 9/1999 | Lin .............................. | 385/18 |
| 6,005,698 A | * | 12/1999 | Huber et al. ................ | 359/117 |
| 6,008,934 A | * | 12/1999 | Fatehi et al. ............ | 359/341.33 |
| 6,014,480 A | * | 1/2000 | Baney ......................... | 385/24 |
| 6,430,336 B1 | * | 8/2002 | Frankel ....................... | 385/24 |
| 6,445,841 B1 | * | 9/2002 | Gloeckner et al. .......... | 385/17 |
| 6,459,516 B1 | * | 10/2002 | Mizrahi et al. ............ | 359/127 |
| 6,459,827 B1 | * | 10/2002 | Hait ............................ | 385/11 |

* cited by examiner

Primary Examiner—Tulsidas Patel
(74) Attorney, Agent, or Firm—Christie, Parker & Hale, LLP (57) ABSTRACT

To improve the reliability of matrix switches of redundant configuration, a splitter (14) splits each of a plurality of input lights into two portions and applies them to corresponding input ports of matrix switches (10a and 10b). The working matrix switch (10a) connects between desired input and output ports and an optical shutter (30a) connecting to an output port (#1) is in a light transmission state. The matrix switch (10b) connects all its input ports (#1 through #8) to an output port (#1). An optical shutter (30b) connecting to an output port (#1) is in a light blocking state. A combiner (26) combines the lights which are output from the output ports (#1) of the matrix switches (10a and 10b) and transmitted through the optical shutters (30a and 30b) and also combines the output lights from the corresponding output ports (#2 through #8) of the matrix switches (10a and 10b).

13 Claims, 7 Drawing Sheets

OPTICAL CROSS-CONNECTOR

CROSS-REFERENCE TO RELATED APPLICATION

This application claims priority of Japanese Patent application number 2000-285160, filed Sep. 20, 2000.

FIELD OF THE INVENTION

This invention relates to an optical cross-connector, and more specifically to an optical cross-connector of a redundant configuration to control paths of optical signals.

BACKGROUND OF THE INVENTION

Keeping pace with the spread of the Internet, a big demand for a larger transmission capacity has skyrocketed. An optical a fiber transmission system is suitable for a large capacity data transmission. In particular, high-speed data transmission is easily realized by using a wavelength multiplexing transmission system to transmit a plurality of optical signals having different wavelengths. The number of multiplexed wavelengths per fiber and the transmission capacity to be required per user has strikingly increased. In recent years, such a system to offer one wavelength for one user as an exclusive channel has been strongly demanded. A conventional configuration in which an electric network switching apparatus is disposed per wavelength to demultiplex into low-speed electric interfaces, add/drop, and cross-connect at a low-speed interface unit has severe problems of increasing the cost, reducing the operational efficiency, and extending the installation space of terminal stations. Accordingly, a realization of an optical network switching apparatus having effective functions of path housing, adding/dropping, and network switching has expected.

In an optical network switching apparatus, a changeover switch is necessary to realize adding/dropping of wavelength channels and switching of paths. As the changeover-switching element, an optical matrix switch to connect between desired input and output fibers by selectively standing each mirror disposed on each node of matrixes has attracted a great deal of attention (see U.S. Pat. No. 5,960,132). This optical matrix switch has a merit to be fabricated compact using micro-machining technology.

To realize a continuous operation even if a matrix switch has a failure, it is necessary to make matrix switches redundant. For instance, in a dual configuration in which two matrix switches are prepared, one is for working and the other is for protection, it is required to dispose optical splitters of the same number with the input fibers on the input side to distribute input optical signals to the same input ports of the two matrix switches, and also to dispose optical selectors of the same number with the output fibers on the output side to select one of the same output ports of the two matrix switches. In short, in this configuration, it is necessary to dispose optical selector switches of the same number with the output ports of the matrix switches.

However, in this configuration, a break of approximately 10 ms basically occurs when the optical selector switch switches over. This break causes an extremely large amount of loss in recent ultra-high speed transmission systems, and thus it is undesirable.

Furthermore, the optical selector switch is fundamentally an active component and not reliable. Therefore, the reliability of the whole apparatus, namely the reliability of the service traffic, is remarkably lowered as the number of the optical selector switches increases proportional to the number of the output fibers. This is because that the reliability of the whole apparatus is determined depending on the reliability of the optical selector switch (more specifically, it is calculated by raising the reliability of a signal optical selector switch to the power of the number of the optical selector switches) rather than the reliability of the matrix switches.

When any optical selector switch breaks, the broken one is naturally replaced. The replacement takes mean time to repair (MTTR) at least one hour and even one day in a prolonged case, and the main signal path is broken during the repair time. This means to stop the communication service, and this is a severe problem.

When all optical selectors are mounted on a single substrate, the whole substrate is replaced, and when each optical selector switch is mounted on a separate substrate, the broken optical selector switch alone is replaced. In the latter case, although there is a merit that signal paths having no connection with the broken selector switch can be maintained in the present state, there is also a demerit that the housing efficiency deteriorates as the number of the output fibers increases. For example, even in a common four-fiber ring network, it is necessary to dispose eight optical selector switch substrates because eight output optical fibers exist.

SUMMARY OF THE INVENTION

It is therefore an object of the present invention to provide an optical cross-connector to double matrix switches and realize higher reliability.

An optical cross-connector according to the invention consists of first and second optical distributors, each distributor having a plurality of input and output ports, a first connecting mode to connect between desired input and output ports, and second connecting mode to block outputting of input lights of all the input ports; a splitter to split each of a plurality of input optical signals into two portions and apply them to each input port of the first and second optical distributors; a combiner to combine output lights from mutually corresponding output ports of the first and second optical distributors; and a controller to switch between a first control state to set the first optical distributor in the first connecting mode and the second optical distributor in the second connecting mode and a second control state to set the first optical distributor in the second connecting mode and the second optical distributor in the first connecting mode.

The above configuration can make the optical distribution redundant using fewer movable components.

Preferably, the first optical distributor consists of a first optical switch having a plurality of input and output ports to connect between desired input and output ports in the first connecting mode and connect input lights of all the input ports to at least one predetermined output port in the second connecting mode and at least one first optical shutter disposed between the at least one predetermined output port of the first optical switch and a corresponding input port of the combiner to transmit light in the first connecting mode and block light in the second connecting mode, and the second optical distributor consists of a second optical switch having a plurality of input and output ports to connect between desired input and output ports in the first connecting mode and connect input lights of all the input ports to at least one predetermined output port in the second connecting mode and at least one second optical shutter disposed between the at least one predetermined output port of the second optical switch and a corresponding input port of the combiner to transmit light in the first connecting mode and block light in the second connecting mode.

According to this configuration, it is sufficient if at least one optical shutter is disposed on each optical switch. Even if the number of output lines is increased, two optical shutters at the minimum are sufficient for each optical switch. Therefore, the reliability improves remarkably.

Preferably, the optical cross-connector according to the invention further consists of a first input detector to detect input light of each input port of the first optical switch, a second input detector to detect input light of each input port of the second optical switch, a first output detector to detect output light from each output port of the first optical switch, a second output detector to detect output light from each output port of the second optical switch, and a supervisor to monitor the detection outputs from the first and second input detectors and first and second output detectors. According to this configuration, the inputs/outputs of an optical switch can be separately monitored.

Preferably, the supervisor monitors the abnormal operation of the first and second switches through the operation mode of the first and second switches controlled by the controller and the detection outputs from the first and second input detectors and first and second output detectors. With this function, it is possible to constantly monitor whether both first and second optical switches are appropriately operating or not.

Preferably, the optical cross-connector according to the invention further consists of an input detector to detect each of the plurality of input optical signals of the combiner, a first output detector to detect output light from each output port of the first optical switch, a second output detector to detect output light from each output port of the second optical switch, and a supervisor to monitor the detection outputs from the input detector and first and second output detectors. With this configuration, it is possible to reduce the means to detect inputs of an optical switch.

Preferably, the supervisor monitors the abnormal operation of the first and second switches through the operation mode of the first and second switches controlled by the controller and the detection outputs from the input detector and first and second output detectors. With this function, it is possible to constantly monitor whether both first and second optical switches are appropriately operating or not.

Preferably, the optical cross-connector according to the invention further consists of a first input detector to detect input light of each input port of the first optical distributor, a second input detector to detect input light of each input port of the second optical distributor, a first output detector to detect output light from each output port of the first optical distributor, a second output detector to detect output light from each output port of the second optical distributor, and a supervisor to monitor the detection outputs from the first and second input detectors and first and second output detectors. With this configuration, inputs/outputs of optical distributors can be separately monitored.

Preferably, the supervisor monitors the abnormal operation of the first and second distributors through the operation mode of the first and second distributors controlled by the controller and the detection outputs from the first and second input detectors and first and second output detectors. With this configuration, it is possible to constantly monitor whether both first and second optical distributors are appropriately operating or not.

Preferably, the optical cross-connector according to the invention further consists of an input detector to detect each of the plurality of input optical signals of the combiner, a first output detector to detect output light from each output port of the first optical distributor, a second output detector to detect output light from each output port of the second optical distributor, and a supervisor to monitor the detection outputs from the input detector and first and second output detectors. With this configuration, it is possible to reduce the means to detect inputs of optical distributors.

Preferably, the supervisor monitors the abnormal operation of the first and second distributors through the operation mode of the first and second distributors controlled by the controller and the detection outputs from the input detector and first and second output detectors. With this configuration, it is possible to constantly monitor whether both first and second optical distributors are appropriately operating or not.

Preferably, when the controller switches the first and second optical distributors from the first control state to the second control state, it sets the first optical distributor in the second connecting mode after or at the same time of setting the second optical distributor in the first connecting mode. With this operation, it is possible to reduce the time of signal break caused by the switching to the protection system into practically zero.

BRIEF DESCRIPTION OF THE DRAWING

The above and other objects, features and advantages of the present invention will be apparent from the following detailed description of the preferred embodiments of the invention in conjunction with the accompanying drawings, in which:

FIG. 2 shows an example of path setting condition of a matrix switch 10a;

DESCRIPTION OF THE PREFERRED EMBODIMENT

Embodiments of the invention are explained below in detail with reference to the drawings.

Figure 1:
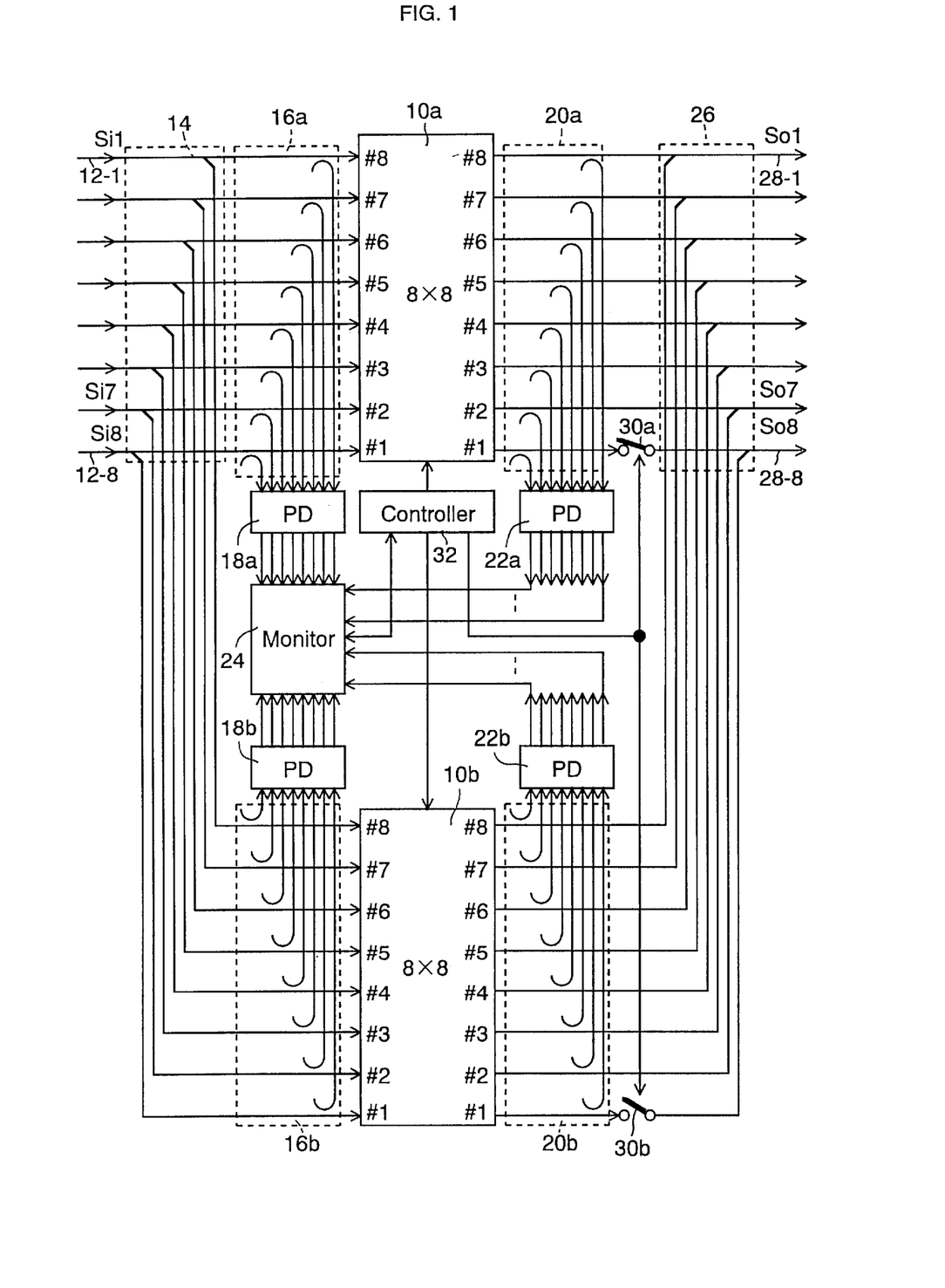
FIG. 1 shows a schematic block diagram of a first embodiment according to the invention.

FIG. 1 shows a schematic block diagram of a first embodiment according to the invention. The embodiment in FIG. 1 has eight input fibers and eight output fibers.

Reference numerals 10a and 10b denote 8×8 matrix switches of the same configuration. Optical signals Si1 through Si8 enter input optical fibers 12-1 through 8 respectively. The optical signals Si1 through Si8 on the input optical fibers 12-1 through 8 are split into two portions by a splitter 14, and one portion enters corresponding input ports #1 through #8 of the matrix switch 10a respectively while the other enters corresponding input ports #1 through #8 of the matrix switch 10b. The splitter 14 consists of a 3 dB optical coupler disposed on each of the fibers 12-1 through 8. With this configuration the same optical signals Si1 through Si8 constantly enter the corresponding input ports #1 through #8 of the matrix switches 10a and 10b.

A splitter 16a consists of a 20 dB optical coupler disposed on each line. The splitter 16a applies most of one portion of the lights split by the splitter 14 to the matrix switch 10a and applies only a small amount (for example, optical power of 1/100) to a photodetector 18a as a monitoring light. Similarly, a splitter 16b consists of a 20 dB optical coupler disposed on each line. The splitter 16b applies most of the other portion of the lights split by the splitter 14 and applies only a small amount (for example, optical power of 1/100) to a photodetector 18b as a monitoring light.

In addition, a splitter 20a consists of a 20 dB optical coupler disposed on each line. The splitter 20a splits a small amount (for example, optical power of 1/100) of the light output from each of the output ports #1 through #8 of the matrix switch 10a and applies it to a photodetector 22a as a monitoring light. Similarly, a splitter 20b consists of a 20 dB optical coupler disposed on each line. The splitter 20b splits a small amount (for example, optical power of 1/100) of the light output from each of the output ports #1 through #8 of the matrix switch 10b and applies it to a photodetector 22b as a monitoring light.

Each of the photodetectors 18a, 18b, 22a, and 22b comprises an array of eight photodetecting elements, and applies an electric signal indicating mean optical power output of each of 8 lines to a monitor circuit 24 or a supervisor. With this configuration, the monitor circuit 24 can monitor whether or not the eight input optical signals and output optical signals exist.

An optical combiner 26 combines the rest of the light from the splitter 20a and that of the light from the splitter 20b at the corresponding output ports of the matrix switches 10a and 10b and outputs the combined lights to the respective output optical fibers 28-1 through 8. However, in this embodiment, an optical shutter 30a to transmit the optical output from the output port #1 of the matrix switch 10a and apply to the combiner 26 or to block the optical output is disposed, and similarly an optical shutter 30b to transmit the optical output from the output port #1 of the matrix switch 10b and apply to the combiner 26 or to block the optical output is disposed.

A controller 32 controls the matrix switches 10a, 10b and optical shutters 30a, 30b operating harmoniously with a monitor circuit 24. When the switch 30a is in a light transmission state, the switch 30b is in a light blocking state, and conversely when the switch 30a is in a light blocking state, the switch 30b is in a light transmission state. One of the matrix switches 10a and 10b is practically used for a network switching, and the other is kept in the protection state.

The matrix switches 10a and 10b have a configuration in which a mirror that is controllable to rise up from the outside is disposed on each node of matrixes so that desired input and output ports can be optically connected by selecting a mirror for rising-up. Although its details are disclosed in the U.S. Pat. No. 5,960,132, the function is briefly explained below.

Figure 2:
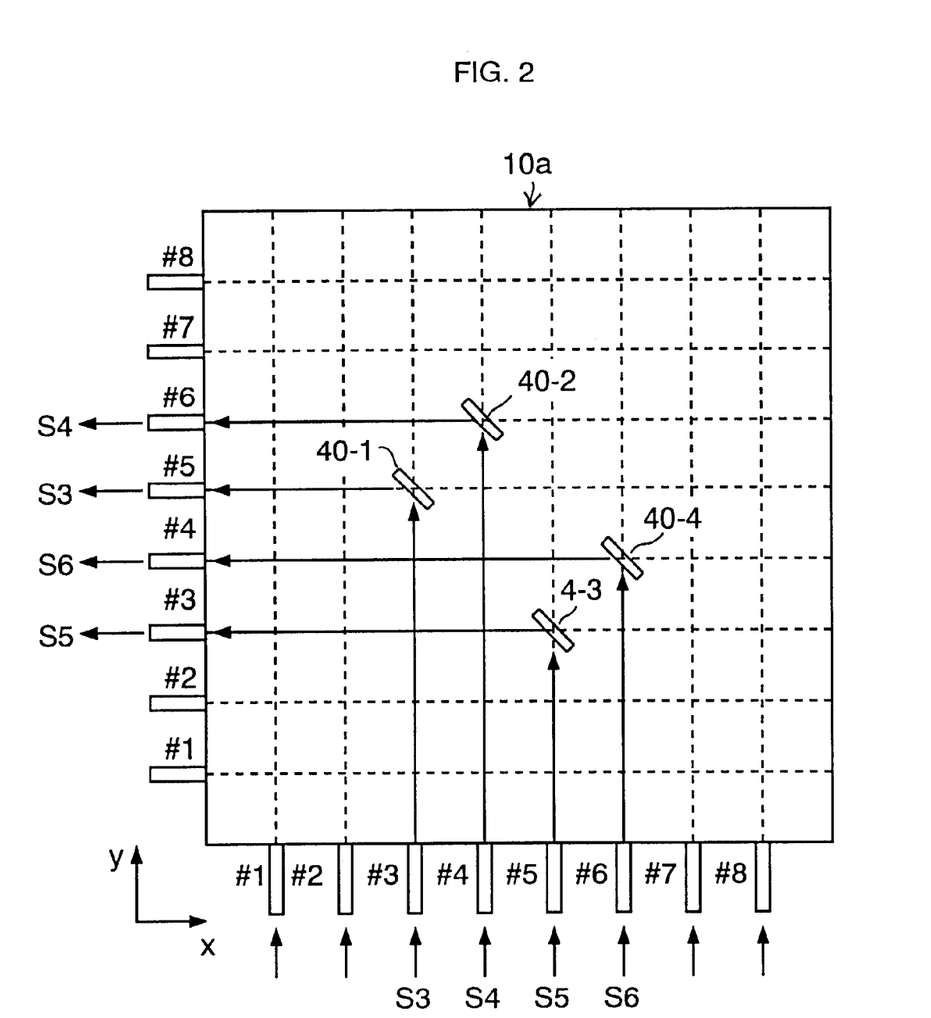

FIG. 2 shows a path setting example of the matrix switches 10a and 10b. Here, the coordinates of node of an input port #n and an output port #m are expressed as (n, m). In the example shown in FIG. 2, mirrors 40-1, 40-2, 40-3, and 40-4 rise up on the coordinates (3, 5), (4, 6), (5, 3), and (6, 4) respectively. In this condition, the input port #3 and the output port #5 are optically connected, the input port #4 and the output port #6 are optically connected, and the input port #6 and the output port #4 are optically connected. Consequently, an optical signal S3 entered the input port #3 is output from the output port #5, an optical signal S4 entered the input port #4 is output from the output port #6, an optical signal S5 entered the input port #5 is output from the output port #3, and an optical signal S6 entered the input port #6 is output from the output port #4.

Figure 3:
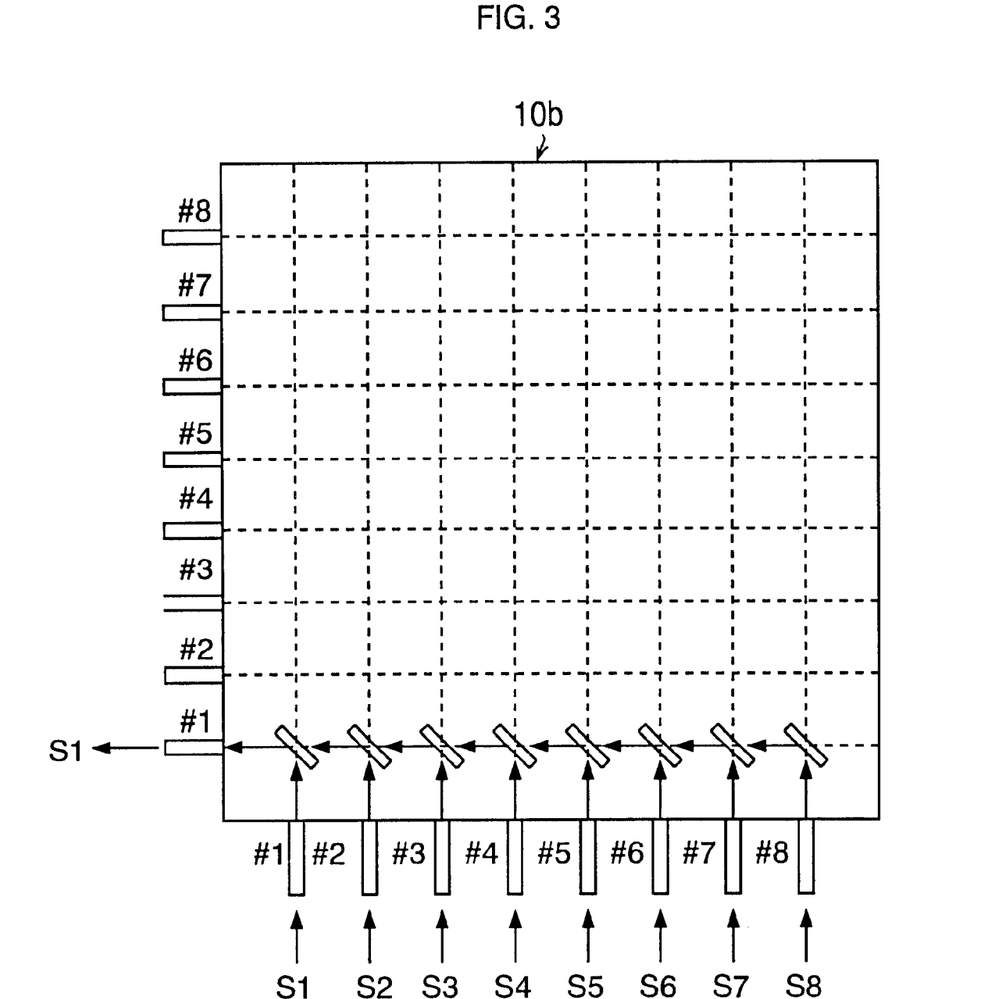
FIG. 3 shows a connecting example of a matrix switch 10b in a protection state.

In such a condition that the matrix switch 10a is used for network switching and the matrix switch 10b is on protection, the operation of this embodiment is explained below. In this condition, the controller 32 sets the optical shutter 30a in the light transmission state and the optical shutter 30b in the light blocking state as well as controls the protection matrix switch 10b so as to exclusively connect all the optical inputs from the input ports #1 through #8 to the output port #1 and maintain the condition. This connecting condition of the matrix switch 10b is expressed as a "protection state". FIG. 3 shows a path setting example of the matrix switch 10b in the protection state. Specifically, the controller 32 rises up mirrors of the coordinates (n, 1) (Here, n=1 through 8) of the matrix switch 10b so that all the input ports #1 through #8 connect to the output port #1. In this condition, optical inputs of the input ports #2 through #8 do not arrive at the output port #1 interfered by the mirror corresponding to the inner input ports, and only the optical input of the input port #1 can output from the output port #1. However, since the optical shutter 30b is in the light blocking state, the optical input S1 of the input port #1 cannot arrive at the combiner 26.

The input optical signals Si1 through Si8 propagate on input optical fibers 12-1 through 8 respectively, are split into two portions by the splitter 14, and enter the ports #1 through #8 of the matrix switches 10a and 10b. At that time, the splitter 16a splits a portion of the optical signals input to each of the input ports #1 trough #8 of the matrix switch 10a from the combiner 14 and applies the split lights to the photodetector 18a. The photodetector 18a converts each of the optical inputs into an electric signal and applies the mean optical power information of the optical signal input to each of the input ports #1 through #8 of the matrix switch 10a to the monitor circuit 24. Similarly, the splitter 16b splits a portion of the optical signals input to each of the input ports #1 through #8 of the matrix switch 10b from the combiner 14 and applies the split light to the photodetector 18b. The photodetector 18b converts each of the optical inputs into an electric light and applies the mean optical power information of the optical signal input to each of the input ports #1 through #8 of the matrix switch 10b to the monitor circuit 24.

The matrix switch 10a connects the optical input of each of input ports #1 through #8 to any one of the output ports #1 through #8 under the control of the controller 32. Since the optical shutter 30a is closed, the optical outputs of the output ports #1 through #8 of the matrix switch 10a enter the output optical fibers 28-1 through 8 respectively via the splitter 20a and the combiner 26 and output from the output optical fibers 28-1 through 8 as output optical signals So1 through So8. On the other hand, since the matrix switch 10b is in the protection state, the optical signals output from the output port #1 alone as far as the matrix switch 10b is normally operating. However, the optical signals cannot arrive at the combiner 26 because the optical shutter 30b is in the light blocking state. Consequently, the optical signals applied to the output optical fibers 28-1 through 8 are exclusively the ones crossconnected by the matrix switch 10a. In other words, the embodiment is in the condition to select the optical outputs from the matrix switch 10a.

The splitter 20*a* splits a portion of the optical outputs from the output ports #1 through #8 of the matrix switch 10*a* and applies the split lights to the photodetector 22*a*. The photodetector 22*a* converts each of the optical inputs into an electric signal and applies the mean optical power information of the optical output from each of the output ports #1 through #8 of the matrix switch 10*a* to the monitor circuit 24. Similarly, the splitter 20*b* splits a portion of the optical outputs from the output ports #1 through #8 of the matrix switch 10*b* and applies the split lights to the photodetector 22*b*. The photodetector 22*b* converts each of the optical outputs into an electric signal and applies the mean optical power information of the optical output from each of the output ports #1 through #8 of the matrix switch 10*b* to the monitor circuit 24.

Regardless of which of the matrix switches 10*a* and 10*b* is in the protection state, the monitor circuit 24 monitors the optical inputs of all the input ports #1 through #8 and the optical outputs from the all the output ports #1 through #8 of the matrix switches 10*a* and 10*b*. It is possible to check whether the matrix switch 10*a* is normally operating or not by comparing the crossconnect control condition (the information that mirrors on which nodes rise up) of the matrix switch 10*a* which is working and the monitor results about the input condition of the input ports #1 through #8 and the output condition of the output ports #1 through #8 of the matrix switch 10*a*. For example, an exclusive-or operation of the monitor results of optical input and output of the mutually connected input and output ports is carried out. When the result is '1', it means abnormal, and when the result is '0', it means normal. In addition, when any optical output exists in the output ports #2 through #8 of the protection matrix switch 10*b*, it means that the matrix switch 10*b* is substantially not in the protection state, namely it is broken.

Here, it is assumed that the matrix switch 10*a* has a failure for some reason. For example, the failure could be such cases that the switchover to another connecting relation between an input port and an output port becomes impossible and the connecting relation between an input port and an output port is changed without intention. In such cases, the monitor circuit 24 instructs the controller 32 to switch to the protection system or spare system, namely to the matrix switch 10*b*. The controller 32 sets the matrix switch 10*a* into the protection state, the matrix switch 10*b* into a desired cross-connect state, the optical shutter 30*a* into the light blocking state, and the optical shutter 30*b* into the light transmission state according to the instruction from the monitor circuit 24.

Generally, the connection of the working system is closed first, and after that the use of the protection system starts within a predetermined permissive disconnection time. In this embodiment, it is also possible to switch from the working system to the protection system. However, in the embodiment, the optical outputs of the protection system and working system except for the optical shutters 30*a* and 30*b* are normally optically connected by the combiner 26, and thus it is possible to start the operation of the protection system first and then the working system is closed. In this case, it is possible to continuously switch from the matrix switch 10*a* to the matrix switch 10*b* and vice versa without any instantaneous disconnection. Although there is a possibility that momentary interference occurs and has a bad influence to signals according to the optical path lengths of both systems, its inconvenience does not practically differ from that of the nonoperating condition occurring between the close of the working system and the start of the protection system, namely the instantaneous disconnection. When the interference does not occur, it is possible to continuously change from the working system to the protection system without any instantaneous disconnection. Obviously, this merit is much more important than the demerit of the interference.

As understandable from FIGS. 2 and 3, even if any mirror to connect an optical input of any input port to any one of the output ports #2 through #8 has a failure, for example it is impossible to put back or rise up the mirror, as far as the mirror to connect the optical input of the input port to the output port #1 can rise up, it is possible to prevent such a situation that the optical input of the input port is output from the output ports #2 through #8. Accordingly, as far as the matrix switch 10*a* can shift to the protection state and the optical shutter 30*a* can be controlled in the light blocking state, it is possible to stop the use of the matrix switch 10*a* and switch to the protection matrix switch 10*b*. Naturally, this is on the assumption that matrix switch 10*b* can be normally used and the optical shutter 30*b* can be controlled in the light transmission state.

Although the splitters 16*a*, 16*b*, 20*a*, and 20*b* consist of a 20 dB optical coupler disposed on each line, they can also consist of a 10 dB optical coupler, a 30 dB optical coupler or a component to extract leaky mode of optical fiber.

Although the 8×8 matrix switches 10*a* and 10*b* are explained as examples of the above embodiment, an n×n configuration such as 32×32 and 128×128 or an n×m configuration such as 12×8 is also applicable.

In the embodiment shown in FIG. 1, although the optical inputs of all the input ports #1 through 8 are concentrated to the output port #1 in the protection matrix switch 10*b*, it is also applicable to concentrate to the output port #1 or #2. In that case, an optical shutter similar to the optical shutter 30*b* should be connected to each of the output ports #1 and #2 of the matrix switch 10*b*. The probability that both of a mirror to connect an optical input of any input port to the output port #1 and a mirror to connect the optical input of the same input port to the output port #2 are simultaneously broken is unrealistically low, and therefore the reliability of redundancy configuration is remarkably improved. Naturally, an optical shutter similar to the optical shutter 30*a* is connected to each of the output ports #1 and #2 of the matrix switch 10*a*. Since this structure requires only two optical shutters per matrix switch 10*a* compared to the eight selector switches of the conventional structure, the failure probability greatly decreases and the reliability improves.

In the embodiment shown in FIG. 1, although the optical inputs of all the input ports #1 through #8 of the matrix switches 10*a* and 10*b* are monitored, it can be simplified to monitor whether or not any optical signal inputs the optical input fibers 12-1 through 8, because the possibility that the optical coupler has a failure is quite low.

Figure 4:
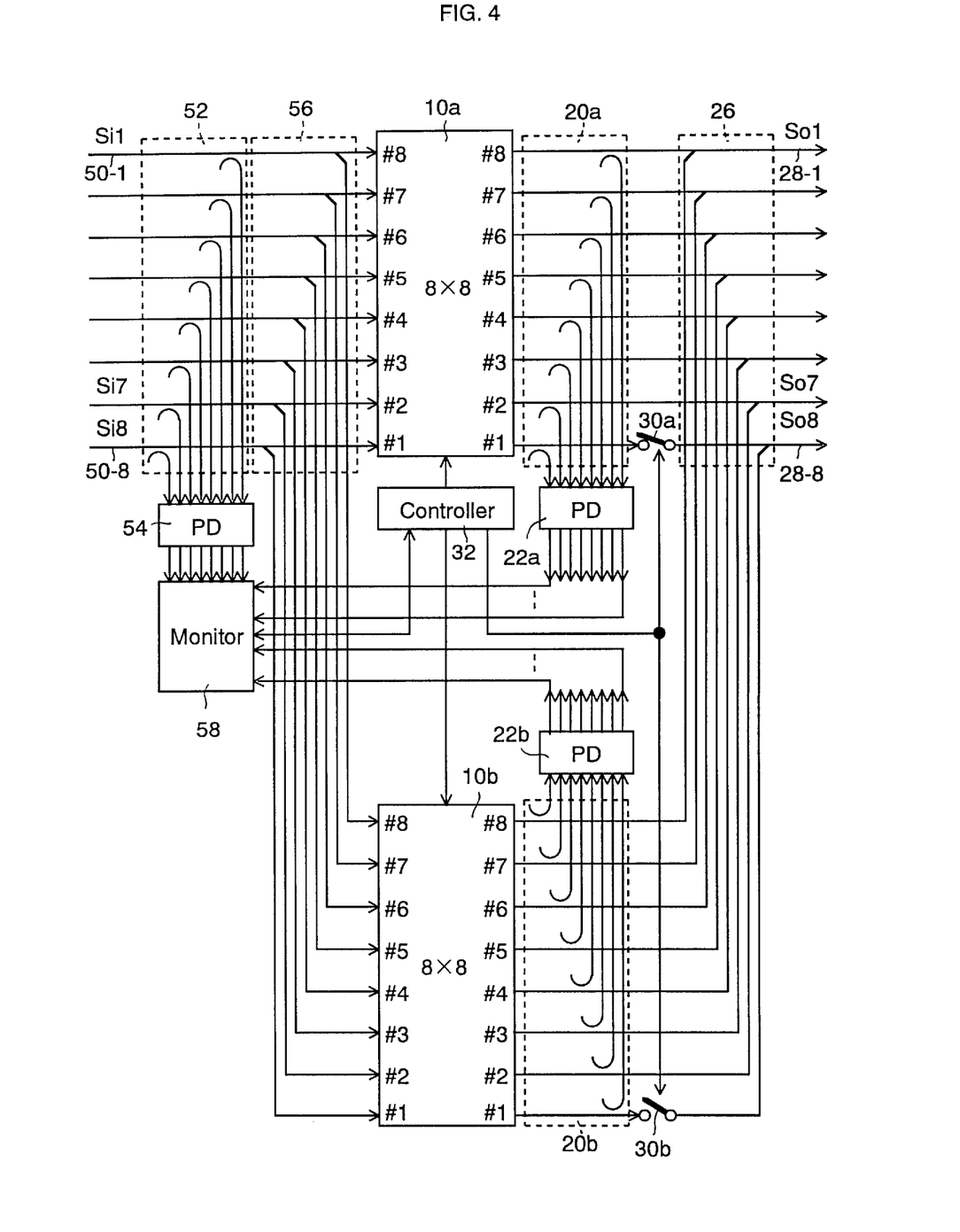
FIG. 4 is a schematic block diagram of a modified embodiment according to the invention.

FIG. 4 shows a schematic block diagram of the embodiment modified according to the above-description. The identical elements to those in FIG. 1 are labeled with the same reference numerals. Optical signals Si1 through Si8 enter optical input fibers 50-1 through 8 respectively. A splitter 52 composed of a 20 dB optical coupler and disposed on each of the optical input fibers 50-1 through 8 splits corresponding one of the optical signals Si1 through Si8 of 1/100 optical power and applies it to a photodetector 54 as a monitoring light and the rest to a splitter 56. The splitter 56 splits the respective optical signals Si1 through Si8 from the splitter 52 into two portions and applies one portion to the corresponding input ports #1 through #8 of the matrix switch 10a and the other to the corresponding input ports #1 through #8 of the matrix switch 10b.

The photodetector 54 outputs electric signals indicating the mean optical power of the respective optical signals Si1 through Si8 input from the splitter 52 to a monitor circuit 58. The monitor circuit 58 considers the respective electric outputs from the photodetector 54 as the ones to indicate the mean optical power of the optical signals input the respective input ports #1 through #8 of the matrix switches 10a and 10b and processes them in the same way with the monitor circuit 24. Since the splitter 56 composed of a 3 dB optical coupler is hardly broken and highly reliable, there is little possibility to fail the process even if the optical signals input the respective input ports #1 through #8 of the matrix switches 10a and 10b were not monitored directly. In the embodiment shown in FIG. 4, the splitter 16b and photodetector 18b can be omitted to reduce the number of the input ports of the monitor circuit, and therefore it is possible to reduce the number of whole elements and simplify the electric circuit.

Figure 5:
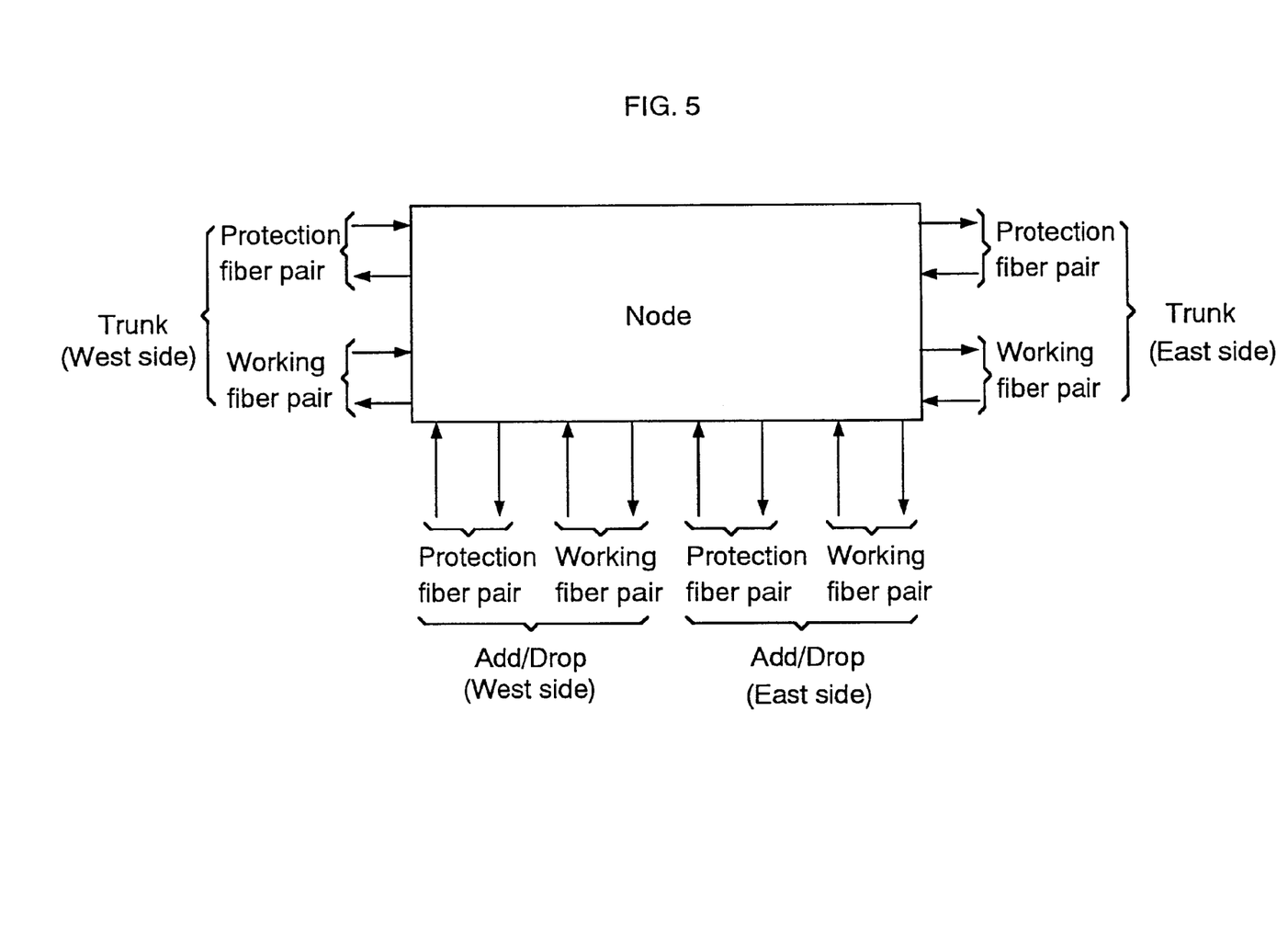
FIG. 5 is a schematic diagram showing an optical input/output configuration of a node in a four-fiber network.

FIG. 5 shows an optical input/output configuration of node of a four-fiber network in which each line is dualized with different priorities. As shown in FIG. 5, in this configuration, a node has one channel of main signal traffic and one channel of extra traffic on either of west and east sides, and thus four inputs and outputs are required as add/drop ports. In addition, a working fiber pair and a protection fiber pair are set on either of west and east sides, and thus the trunk port also needs four inputs and outputs. Accordingly, optical crossconnects of eight inputs and outputs are required at the minimum.

When the embodiment shown in FIG. 1 is applied to a four-fiber network, the following is an example for the correspondence. That is, the optical input fiber 12-1: the protection add port on the west side;

the optical input fiber 12-2: the protection add port on the east side;

the optical input fiber 12-3: the working add port on the west side;

the optical input fiber 12-4: the working add port on the east side;

the optical input fiber 12-5: the working trunk (input) on the west side;

the optical input fiber 12-6: the working trunk (input) on the east side;

the optical input fiber 12-7: the protection trunk (input) on the west side; and the optical input fiber 12-8: the protection trunk (input) on the east side.

Further, the optical output fiber 28-1: the protection drop port on the west side;

the optical output fiber 28-2: the protection drop port on the east side;

the optical output fiber 28-3: the working drop port on the west side;

the optical output fiber 28-4: the working drop port on the east side;

the optical output fiber 28-5: the working trunk (output) on the west side;

the optical output fiber 28-6: the working trunk (output) on the east side;

the optical output fiber 28-7: the protection trunk (output) on the west side; and the optical output fiber 28-8: the protection trunk (output) on the east side.

Figure 6:
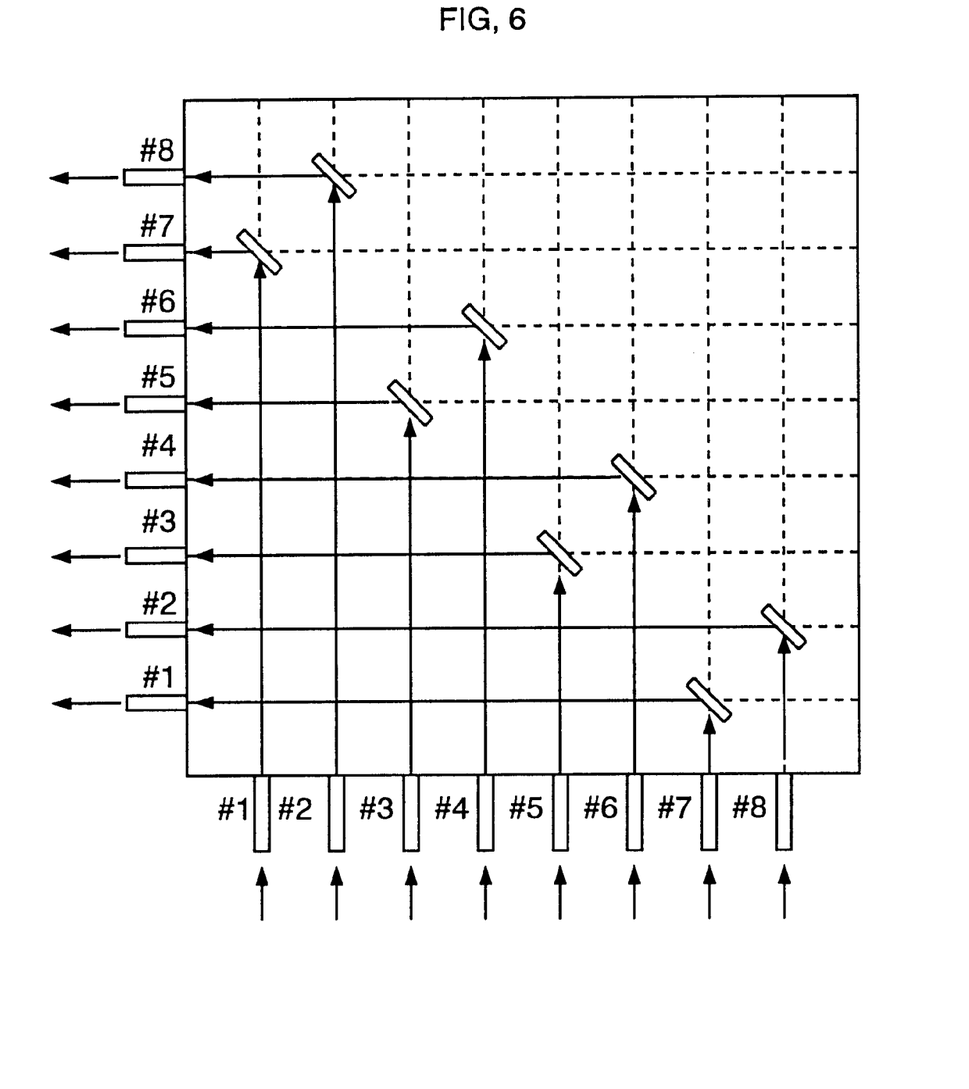
FIG. 6 shows an example of path setting state of the matrix switch 10a when it is applied to a four-fiber network.

FIG. 6 shows the path setting condition of the matrix switch 10a of the normal operation to add/drop the main signal traffic and the extra traffic on both west and east sides under the above-connection. Naturally, the matrix switch 10b functioning as a spare is in the-path setting condition shown in FIG. 3.

The main signal traffic is the traffic that is added/dropped at the add/drop working port and propagates on a working trunk fiber pair under the normal operation. When it is affected by a failure in a ring network, it is helped by the protection trunk fiber pair through ring switching or span switching. On the other hand, the extra traffic is the traffic that is added/dropped at the protection add/drop port and propagates on the protection trunk fiber pair. When some failure occurs in the ring network and a protection fiber pair of the corresponding interval is used to save the main signal channel, the extra traffic stops to save the main signal. That is, the extra traffic is given the lower priority. See ITU-T recommendation G. 841 (10/98) for the details.

In the working matrix switch 10a, by assigning the output port #1 and input port #1 to the extra traffic of the lower priority, optical movable components except for the matrix switches 10a and 10b are removed from the path of the main signal traffic of the higher priority and the possibility of misconnection due to the delay of operating timing of the optical shutters 30a and 30b is also removed. Accordingly, the quality and reliability of the main signal can be highly maintained.

Besides the 8×8 configuration, a plurality of channels can be constructed on a single matrix switch and also a bridge to transmit the main signal to a plurality of ports in parallel by utilizing n×n configurations such as 32×32 and 128×128 or n×m configurations such as a 12×8.

Figure 7:
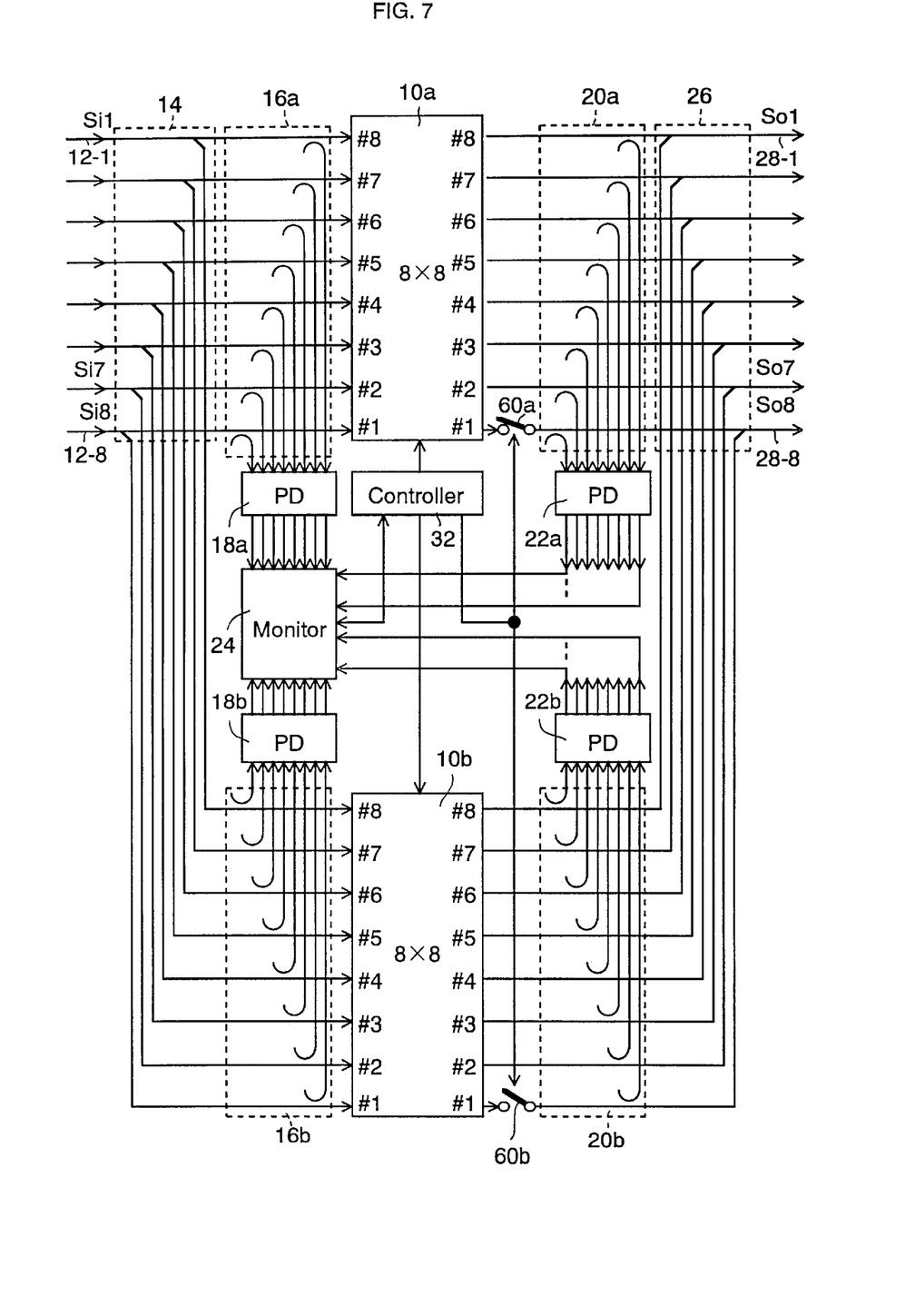
FIG. 7 shows a schematic block diagram of a modification of the embodiment shown in FIG. 1.

In the embodiments shown in FIGS. 1 and 4, although the output light from the output port #1 of the matrix switches 10a and 10b is divided and detected before the optical shutters 30a and 30b, it is also applicable to divide and detect the output light from the optical shutters 30a and 30b. FIG. 7 shows a schematic block diagram of such modified example of the configuration shown in FIG. 1. Elements identical to those in FIG. 1 are labeled with the same reference numbers. Specifically, optical switches 60a and 60b controlled in the manner similar to the optical shutters 30a and 30b by a controller 32 are disposed between the output port #1 of the matrix switches 10a, 10b and an optical coupler on the corresponding line of a splitter 20a. Since the signal path control is basically identical to the embodiment in FIG. 1, the details are omitted. It is obvious that a modification similar to the embodiment in FIG. 1 is also effective for that in FIG. 4.

In the configuration shown in FIG. 7, failures can be detected without distinction of the optical shutters 60a, 60b and the matrix switches 10a, 10b. There is no problem since it is necessary to consider switching to the protection system whichever has a failure. After changed to the protection system, the part to have the failure can be checked. If it is desired to detect the failure of the optical shutters, a configuration to monitor the output light from the optical shutters should be added. Also, optical shutters to output a monitor signal showing its operating condition can be utilized.

As readily understandable from the aforementioned explanation, according to the invention, the reliability greatly improves since it is possible to reduce the optical movable components. For instance, an annual outage (nonoperating time) reduces to approximately 1/1000. Since it is realized using an optical coupler of basically high reliability and compact size, the reliability improves even more and holding capacity is also improved.

In addition, according to the invention, it is possible to reduce the disconnection time for switching from the working system to the protection system to practically zero. Therefore, the possibility to lose signals in a high-speed transmission system can be greatly reduced.

While the invention has been described with reference to the specific embodiment, it will be apparent to those skilled in the art that various changes and modifications can be made to the specific embodiment without departing from the spirit and scope of the invention as defined in the claims.

What is claimed is:

1. An optical cross-connector comprising:
    a first and a second optical distributors, each distributor having a plurality of input ports and a plurality of output ports, a first connecting mode to connect between desired input and output ports, and a second connecting mode to block outputting of input lights of all the input ports;
    a splitter to split each of a plurality of input optical signals into two portions and apply them to each input port of the first and second optical distributors;
    a combiner to combine output lights from mutually corresponding output ports of the first and second optical distributors; and
    a controller to switch between a first control state to cause the first optical distributor to operate in the first connecting mode and the second optical distributor in the second connecting mode, and a second control state to cause the first optical distributor to operate in the second connecting mode and the second optical distributor in the first connecting mode.

2. The optical cross-connector of claim 1 wherein the first optical distributor comprises a first optical switch having a plurality of input ports and a plurality of output ports to connect between desired input and output ports in the first connecting mode, and connect input lights of all the input ports and at least one predetermined output port in the second connecting mode, and at least one first optical shutter disposed between the at least one predetermined output port of the first optical switch and a corresponding input port of the combiner to transmit light in the first connecting mode and block light in the second connecting mode; and
    the second optical distributor comprises a second optical switch having a plurality of input ports and a plurality of output ports to connect between desired input and output ports in the first connecting mode and connect input lights of all the input ports, and at least one predetermined output port in the second connecting mode, and at least one second optical shutter disposed between the at least one predetermined output port of the second optical switch and a corresponding input port of the combiner to transmit light in the first connecting mode and block light in the second connecting mode.

3. The optical cross-connector of claim 2 wherein each of the first and second optical switches comprises a matrix switch.

4. The optical cross-connector of claim 2 further comprising a first input detector to detect input light of each input port of the first optical switch, a second input detector to detect input light of each input port of the second optical switch, a first output detector to detect output light from each output port of the first optical switch, a second output detector to detect output light from each output port of the second optical switch, and a supervisor to monitor the detection outputs from the first and second input detectors and the first and second output detectors.

5. The optical cross-connector of claim 4 wherein the supervisor monitors abnormal operation of the first and second switches through the operation mode of the first and second switches controlled by the controller, and the detection outputs from the first and second input detectors and the first and second output detectors.

6. The optical cross-connector of claim 2 further comprises an input detector to detect each of the plurality of input optical signals of the combiner, a first output detector to detect output light from each output port of the first optical switch, a second output detector to detect output light from each output port of the second optical switch, and a supervisor to monitor the detection outputs from the input detector and the first and second output detectors.

7. The optical cross-connector of claim 6 wherein the supervisor monitors abnormal operation of the first and second switches through the operation mode of the first and second switches controlled by the controller, and detection outputs from the input detector and the first and second output detectors.

8. The optical cross-connector of claim 1 further comprises a first detector to detect input light of each input port of the first optical distributor, a second input detector to detect input light from each input port of the second optical distributor, a first output detector to detect output light from each output port of the first optical distributor, a second output detector to detect output light from each output port of second optical distributor, and a supervisor to monitor detection outputs from the first and second input detectors and the first and second output detectors.

9. The optical cross-connector of claim 8 wherein the supervisor monitors abnormal operation of the first and distributors through the operation mode of the first and second distributors controlled by the controller, and detection outputs from the first and second input detectors and the first and second output detectors.

10. The optical cross-connectors of claim 1 further comprises an input detector to detect each of the plurality of input optical signals of the combiner, a first output detector to detect output light from each output port of the first optical distributor, a second output detector to detect output light from each output port of the second optical distributor, and a supervisor to monitor detection output of the input detector and the first and second output detectors.

11. The optical cross-connector of claim 9 wherein the supervisor monitors abnormal operation of the first and second distributors through the operation mode of the first and second distributors controlled by the controller, and detecting outputs from the input detector and first and second output detectors.

12. The optical cross-connector of claim 1 wherein the controller sets the first optical distributor in the second connecting mode after setting the second optical distributor in the first connecting mode when it switches the first and second optical distributors from the first control state to the second control state.

13. The optical cross-connector of claim 1 wherein the controller sets the second optical distributor in the first connecting mode and sets the first optical distributor in the second connecting mode at the same time when it switches the first and second optical distributors from the first control state to the second control state.

* * * * *